(12) United States Patent
Giraldo et al.

(10) Patent No.: US 9,646,273 B2
(45) Date of Patent: May 9, 2017

(54) SYSTEMS ENGINEERING SOLUTION ANALYSIS

(71) Applicant: International Business Machines Corporation, Armonk, NY (US)

(72) Inventors: Juan P. Giraldo, Gainesville, VA (US); Sharon M. Mohrlock, St. Charles, MO (US)

(73) Assignee: International Business Machines Corporation, Armonk, NY (US)

(*) Notice: Subject to any disclaimer, the term of this patent is extended or adjusted under 35 U.S.C. 154(b) by 331 days.

(21) Appl. No.: 13/924,060

(22) Filed: Jun. 21, 2013

(65) Prior Publication Data
US 2014/0379409 A1 Dec. 25, 2014

(51) Int. Cl.
G06Q 10/06 (2012.01)
G06Q 10/10 (2012.01)

(52) U.S. Cl.
CPC ....... *G06Q 10/06312* (2013.01); *G06Q 10/10* (2013.01)

(58) Field of Classification Search
CPC .............................. G06Q 10/06; G06Q 10/10
USPC ............................ 705/7, 10, 7.11, 7.36, 7.22
See application file for complete search history.

(56) References Cited

U.S. PATENT DOCUMENTS

| 7,590,552 B2 | 9/2009 | Barker et al. | |
| 8,195,492 B2 | 6/2012 | Barker et al. | |
| 8,359,566 B2 | 1/2013 | Chaar et al. | |
| 2005/0198486 A1* | 9/2005 | Desmond et al. | 713/1 |
| 2005/0209943 A1* | 9/2005 | Ballow et al. | 705/35 |
| 2005/0251432 A1* | 11/2005 | Barker et al. | 705/7 |
| 2007/0006161 A1 | 1/2007 | Kuester et al. | |

(Continued)

FOREIGN PATENT DOCUMENTS

| DE | 102005058802 | 6/2007 |
| JP | 2004110333 | 4/2004 |
| WO | 2005096189 | 10/2005 |

OTHER PUBLICATIONS

Sim et al.; Using Benchmarking to Advance Research: A Challenge to Software Engineering; Proceedings of the 25th International Conference on Software Engineering; IEEE Computer Society, 2003; pp. 74-83.

(Continued)

*Primary Examiner* — Nga B Nguyen
(74) *Attorney, Agent, or Firm* — Schmeiser, Olsen & Watts; Michael A. Petrocelli

(57) ABSTRACT

A method and system for performing a technical solution analysis is provided. The method includes receiving requirements associated with an IT system for design, assumptions, dependency data, stakeholder data, and entry criteria readiness data. A quality level of the requirements is evaluated and a requirements quality sub-score for each requirement is calculated. The assumptions are evaluated for hidden requirements and an assumptions score is generated. The dependency data is evaluated and a dependencies score is generated. The stakeholder data is evaluated and a stakeholder approval level score is generated. The entry criteria readiness data is evaluated and an entry criteria readiness score is generated. An overall score summary summarizing the requirements quality score, the assumptions score, the dependencies score, the stakeholder score, and the criteria readiness score is generated.

20 Claims, 16 Drawing Sheets

(56) References Cited

U.S. PATENT DOCUMENTS

| | | |
|---|---|---|
| 2008/0256516 A1 | 10/2008 | Chaar et al. |
| 2008/0270205 A1* | 10/2008 | Kumar et al. .................... 705/7 |
| 2009/0018879 A1* | 1/2009 | Flaxer .................... G06Q 10/06 705/7.11 |
| 2011/0066466 A1* | 3/2011 | Narayanan .................... 705/7.36 |
| 2011/0231817 A1* | 9/2011 | Hadar et al. .................. 717/120 |
| 2012/0102450 A1 | 4/2012 | Choudhary |
| 2012/0116848 A1* | 5/2012 | Gargiulo ............ G06Q 10/0637 705/7.36 |
| 2012/0173437 A1 | 7/2012 | Barker et al. |
| 2012/0215574 A1* | 8/2012 | Driessnack et al. ......... 705/7.12 |
| 2013/0197863 A1* | 8/2013 | Rayate ................ G06F 11/3051 702/186 |

OTHER PUBLICATIONS

Al-Subaie et al.; Evaluating the Effectiveness of a Goal-Oriented Requirements Engineering Method; Fourth International Workshop on Comparative Evaluation in Requirements Engineering; CERE '06; IEEE 2006; pp. 8-19.

* cited by examiner

1132
IF DECi or DEIRi or DEOi or DEMi
"required action"
increase TDRA by 1

SYSTEMS ENGINEERING SOLUTION ANALYSIS

FIELD

The present invention relates generally to a method for analyzing an engineering technical solution, and in particular to a method and associated system for analyzing a technical solution across multiple dimensions.

BACKGROUND

Determining solutions to issues typically includes an inaccurate process with little flexibility. Evaluating multiple solutions may include a complicated process that may be time consuming and require a large amount of resources. Accordingly, there exists a need in the art to overcome at least some of the deficiencies and limitations described herein above.

SUMMARY

A first aspect of the invention provides a method comprising: receiving, by a computer processor of a computing system, requirements (NRQ) associated with an IT system for design, assumptions associated with the complex system requirements, dependency data associated with the requirements (NRQ), stakeholder data associated with the requirements (NRQ), and entry criteria readiness data associated with the requirements (NRQ); evaluating, by the computer processor executing a requirements analytical engine, a quality level of the requirements (NRQ); calculating, by the computer processor based on the quality level, a requirements quality sub-score (RSC) for each requirement of the requirements (NRQ); evaluating, by the computer processor executing an assumptions analytical engine, the assumptions for hidden requirements of the requirements (NRQ); generating, by the computer processor based on the hidden requirements, an assumptions score for the assumptions; evaluating, by the computer processor executing a dependencies analytical engine, the dependency data; generating, by the computer processor based on results of the evaluating the dependency data, a dependencies score for the dependencies data; evaluating, by the computer processor executing a stakeholder analytical engine, the stakeholder data; generating, by the computer processor based on results of the evaluating the stakeholder data, a stakeholder approval level score for the stakeholder data; evaluating, by the computer processor executing a criteria analytical engine, the entry criteria readiness data; generating, by the computer processor based on results of the evaluating the entry criteria readiness data, an entry criteria readiness score (ECRS) for entry criteria readiness data; and generating, by the computer processor, an overall score summary summarizing each the requirements quality score, the assumptions score, the dependencies score, the stakeholder score, and the criteria readiness score.

A second aspect of the invention provides a computing system comprising a computer processor coupled to a computer-readable memory unit, the memory unit comprising instructions that when executed by the computer processor implements a method comprising: receiving, by the computer processor, requirements (NRQ) associated with an IT system for design, assumptions associated with the complex system requirements, dependency data associated with the requirements (NRQ), stakeholder data associated with the requirements (NRQ), and entry criteria readiness data associated with the requirements (NRQ); evaluating, by the computer processor executing a requirements analytical engine, a quality level of the requirements (NRQ); calculating, by the computer processor based on the quality level, a requirements quality sub-score (RSC) for each requirement of the requirements (NRQ); evaluating, by the computer processor executing an assumptions analytical engine, the assumptions for hidden requirements of the requirements (NRQ); generating, by the computer processor based on the hidden requirements, an assumptions score for the assumptions; evaluating, by the computer processor executing a dependencies analytical engine, the dependency data; generating, by the computer processor based on results of the evaluating the dependency data, a dependencies score for the dependencies data; evaluating, by the computer processor executing a stakeholder analytical engine, the stakeholder data; generating, by the computer processor based on results of the evaluating the stakeholder data, a stakeholder approval level score for the stakeholder data; evaluating, by the computer processor executing a criteria analytical engine, the entry criteria readiness data; generating, by the computer processor based on results of the evaluating the entry criteria readiness data, an entry criteria readiness score (ECRS) for entry criteria readiness data; and generating, by the computer processor, an overall score summary summarizing each the requirements quality score, the assumptions score, the dependencies score, the stakeholder score, and the criteria readiness score.

A third aspect of the invention provides a computer program product for technical solution analysis, the computer program product comprising: one or more computer-readable, tangible storage devices; program instructions, stored on at least one of the one or more storage devices, to initiate receiving requirements (NRQ) associated with an IT system for design, assumptions associated with the complex system requirements, dependency data associated with the requirements (NRQ), stakeholder data associated with the requirements (NRQ), and entry criteria readiness data associated with the requirements (NRQ); program instructions, stored on at least one of the one or more storage devices, to evaluate a quality level of the requirements (NRQ); program instructions, stored on at least one of the one or more storage devices, to calculate based on the quality level, a requirements quality sub-score (RSC) for each requirement of the requirements (NRQ); program instructions, stored on at least one of the one or more storage devices, to evaluate the assumptions for hidden requirements of the requirements (NRQ); program instructions, stored on at least one of the one or more storage devices, to generate based on the hidden requirements, an assumptions score for the assumptions; program instructions, stored on at least one of the one or more storage devices, to evaluate the dependency data; program instructions, stored on at least one of the one or more storage devices, to generate based on results of the evaluating the dependency data, a dependencies score for the dependencies data; program instructions, stored on at least one of the one or more storage devices, to evaluate the stakeholder data; program instructions, stored on at least one of the one or more storage devices, to generate based on results of the evaluating the stakeholder data, a stakeholder approval level score for the stakeholder data; program instructions, stored on at least one of the one or more storage devices, to evaluate the entry criteria readiness data; program instructions, stored on at least one of the one or more storage devices, to generate based on results of the evaluating the entry criteria readiness data, an entry criteria readiness score (ECRS) for entry criteria readiness data; and program instructions, stored on at least one of the one or more storage devices, to generate an overall score summary summarizing each the requirements quality score, the assumptions score, the dependencies score, the stakeholder score, and the criteria readiness score.

The present invention advantageously provides a simple method and associated system capable of determining solutions to issues.

DETAILED DESCRIPTION

Figure 1:
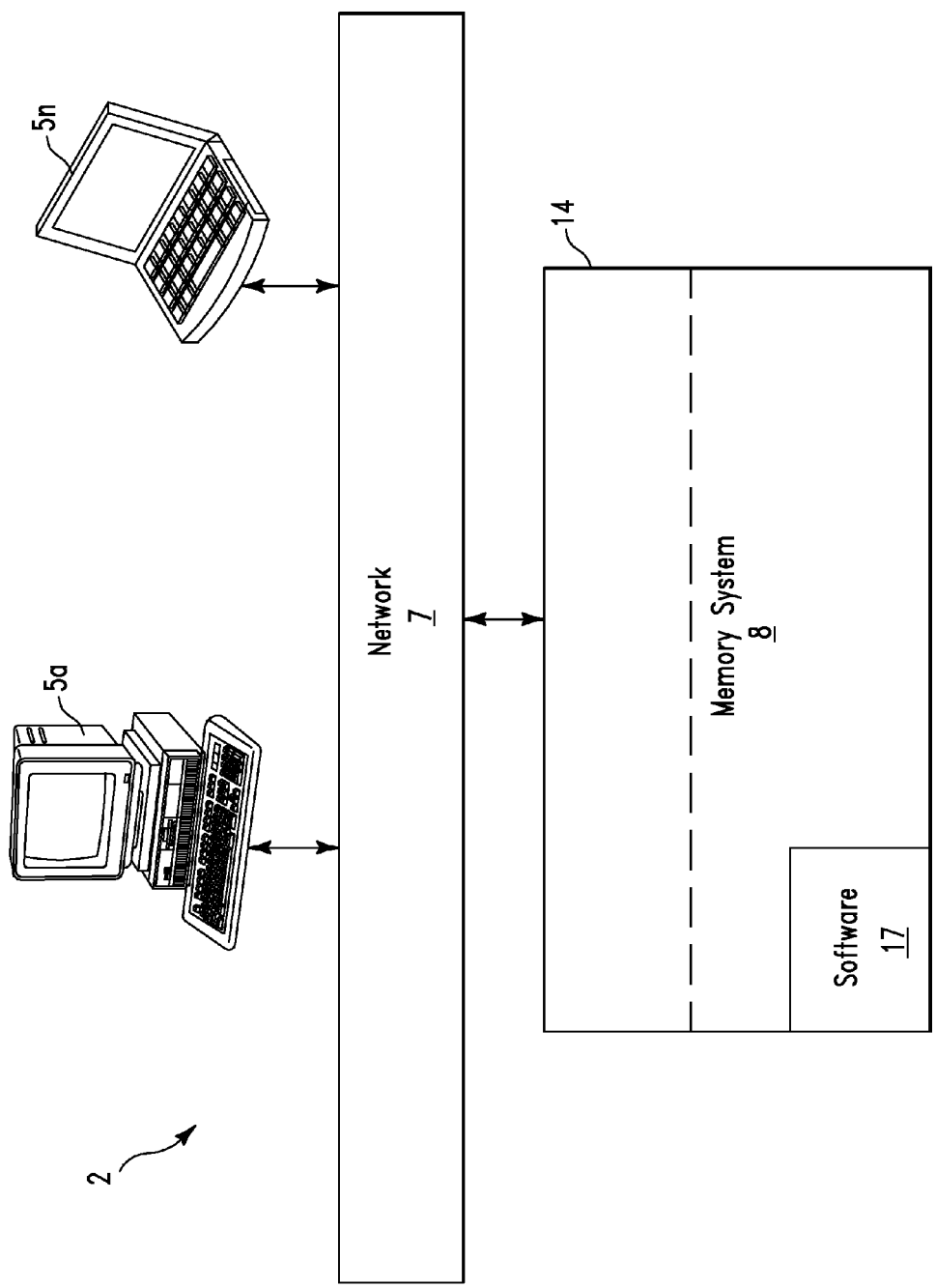
FIG. 1 illustrates a system for providing a means for allowing a systems engineer to analyze technical solutions across multiple dimensions, in accordance with embodiments of the present invention.

FIG. 1 illustrates a system 2 for providing a means for allowing a systems engineer to analyze technical solutions across multiple dimensions, in accordance with embodiments of the present invention. The above and other features of the present invention will become more distinct by a detailed description of embodiments shown in combination with attached drawings. Identical reference numbers represent the same or similar parts in the attached drawings of the invention.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Computer program code for carrying out operations for aspects of the present invention can be written in any combination of one or more programming languages, including an object oriented programming language such as Java, Smalltalk, C++ or the like and conventional procedural programming languages, such as the "C" programming language or any type of programming languages such as, inter alia, an assembly language. The program code can execute entirely on the user's device, partly on the user's device, as a stand-alone software package, partly on the user's device.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

System 2 of FIG. 1 includes computers 5a . . . 5n connected through a network 7 to a computing system 14. Network 7 may include any type of network including, inter alia, a local area network, (LAN), a wide area network (WAN), the Internet, a wireless network, etc. Computers 5a . . . 5n may include any type of computing system(s) including, inter alia, a computer (PC), a laptop computer, a tablet computer, a server, a PDA, a smart phone, etc. Computing system 14 may include any type of computing system(s) including, inter alia, a computer (PC), a laptop computer, a tablet computer, a server, etc. Computing system 14 includes a memory system 8. Memory system 8 may include a single memory system. Alternatively, memory system 8 may include a plurality of memory systems. Memory system 8 includes software 17 comprising multiple analytical engines.

System 2 executing software 17 comprising multiple analytical engines (comprising analytics based algorithms) performs multiple analysis processes including, inter alia, a requirements quality analysis, an assumptions analysis, a dependency analysis, a stakeholder participation analysis, and an entry criteria readiness analysis.

A requirements quality analysis quantifies a quality of a requirement (e.g., business/system/component) based on weighted quality attributes, requirements priority, and type. Each requirement comprises an individual score correlated into an overall requirements quality score. The overall requirements quality score dynamically adjusts based on a number of requirements and the individual requirement scores. Additionally, actions and recommendations are generated based on results of the requirements quality analysis.

An assumptions analysis quantifies content of assumptions (for the requirements) based on weighted common assessment attributes. Each assumption is validated and assessed resulting in a quantified assumption validation score. Additionally, actions and recommendations are generated based on results of the assumption analysis.

A dependency analysis quantifies a content dependencies based on weighted common assessment attributes. Each dependency is validated and assessed resulting in a quantified dependency validation score. Additionally, actions and recommendations are generated based on results of the dependency analysis.

A stakeholder participation analysis tracks and quantifies a review and approval of required stakeholders for any given phase of project development. Additionally, a stakeholder approval score is generated.

An entry criteria readiness analysis quantifies a status of identified entry and exit criteria for any given phase of the project through a series of questions designed to prompt the system engineer for further analysis. Based on answers to the questions, an entry criteria readiness score is generated.

System 2 assigns priorities and weights to each dimension and utilizes each of the aforementioned scores to return a quantified overall score depicting a quality of a technical solution under development thereby allowing the system engineer to perform quality analysis against the criteria. The analytics-based algorithms determine measurable risk and impact through scoring. Additionally, the aforementioned dimensions may be utilized either individually, to perform a standalone analysis of a specific dimension, or in combination for an overall assessment. Alternatively, the aforementioned dimensions provide a means for automation and guidance to train a less experienced system engineer. System 2 allows for:

1. A defined, standardized criteria for requirements quality built into software 17.
2. Criteria weighted for importance and impact to solution development.
3. Pre-defined, selectable answers to evaluate content against. For example, a user selects a response and software 17 automatically calculates a score based on the answers.
4. An ability to generate default issues and actions based on analysis.
5. Algorithms utilized to calculate scores based on assigned weights, priorities, and results of the analysis.
6. An automatic generation of prioritized action lists based on scoring results to focus an author's revision efforts on problems that will have a greatest impact.
7. Detailed job aids and guidelines built into the software 17 with prompts, links, and automation to support the system engineers and practitioners.
8. An ability to generate and export issue and actions lists.

Figure 2:
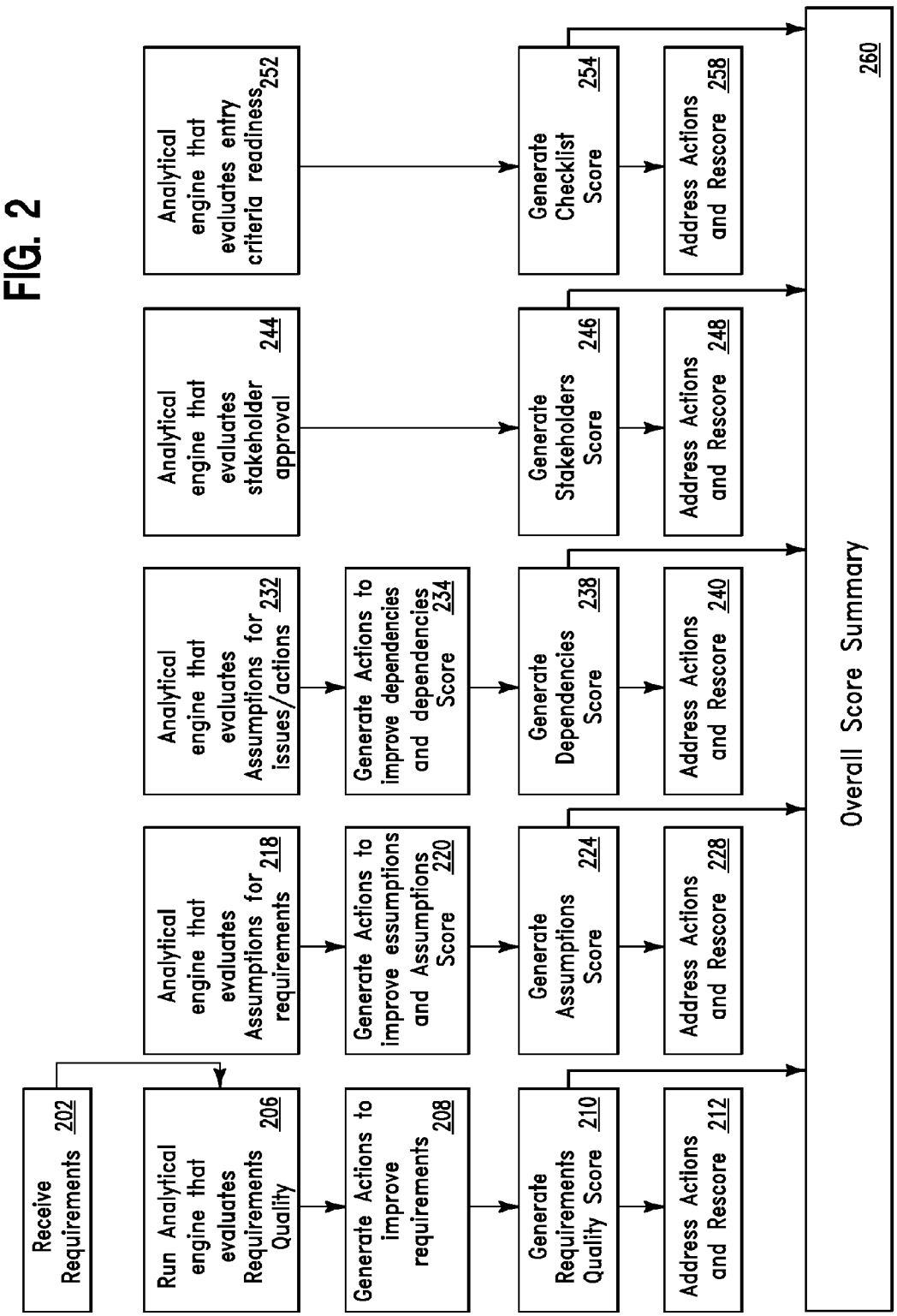
FIG. 2 illustrates an algorithm detailing a process flow enabled by system 2 of FIG. 1 for providing a means for allowing a systems engineer to analyze technical solutions across multiple dimensions, in accordance with embodiments of the present invention.

FIG. 2 illustrates an algorithm detailing a process flow enabled by system 2 of FIG. 1 for providing a means for allowing a systems engineer to analyze technical solutions across multiple dimensions, in accordance with embodiments of the present invention. Each of the steps in the algorithm of FIG. 2 may be enabled and executed in any order by a computer processor executing computer code. In step 202, requirements (NRQ) associated with an IT system for design, assumptions associated with the requirements (NRQ), dependency data associated with the requirements (NRQ), stakeholder data associated with the requirements (NRQ), and entry criteria readiness data associated with requirements (NRQ) are received by a computing system. In step 206, a quality level of the requirements (NRQ) is evaluated by a computer processor executing a requirements analytical engine. In optional step 208, actions for improving the requirements (NRQ) are generated based on results of the evaluation of step 206. In step 210, a requirements quality sub-score (RSC) for each requirement is calculated based on the quality level. In step 212, the actions generated in step 208 are executed with respect to the requirements (NRQ). Additionally, a modified requirements quality subscore associated with the original requirements quality subscore is generated based on the execution results. In step 218, assumptions for hidden requirements (of the requirements (NRQ)) are evaluated by the computer processor executing an assumptions analytical engine. In optional step 220, actions for improving the assumptions are generated based on results of evaluating the assumptions. In step 224, an assumptions score for the assumptions is generated based on the hidden requirements. In step 226, the actions generated in step 220 are executed with respect to executing the actions with respect to the assumptions. Additionally, a modified assumptions score associated with the original assumptions score is generated based on the execution results. In step 232, the dependency data is evaluated by the computer processor executing a dependencies analytical engine. In optional step 234, actions for improving the dependency data are generated based on results of evaluating the dependency data. In step 238, a dependencies score for the dependencies data is generated based on results of evaluating said dependency data. In step 240, the actions generated in step 234 are executed with respect to the dependency data. Additionally, a modified dependencies score associated with the original dependencies score is generated based on the execution results. In step 244, the stakeholder data is evaluated by the computer processor executing a stakeholder analytical engine. In step 246, a stakeholder approval level score for the stakeholder data is generated based on results of evaluating the stakeholder data. In step 248, actions associated with the stakeholder approvals are executed. Additionally, a modified stakeholder approval level score associated with the original stakeholder approval level score is generated based on the execution results. In step 252, the entry criteria readiness data is evaluated by the computer processor executing a criteria analytical engine. In step 254, an entry criteria readiness score (ECRS) for the entry criteria readiness data is generated based on results of evaluating the entry criteria readiness data. In step 258, actions associated with the criteria readiness data are executed. Additionally, a modified entry criteria readiness score (ECRS) associated with the original entry criteria readiness score (ECRS) is generated based on the execution results. In step 260, an overall score summary summarizing each of the: requirements quality score, assumptions score, dependencies score, stakeholder score, and criteria readiness score is generated.

Figure 3:
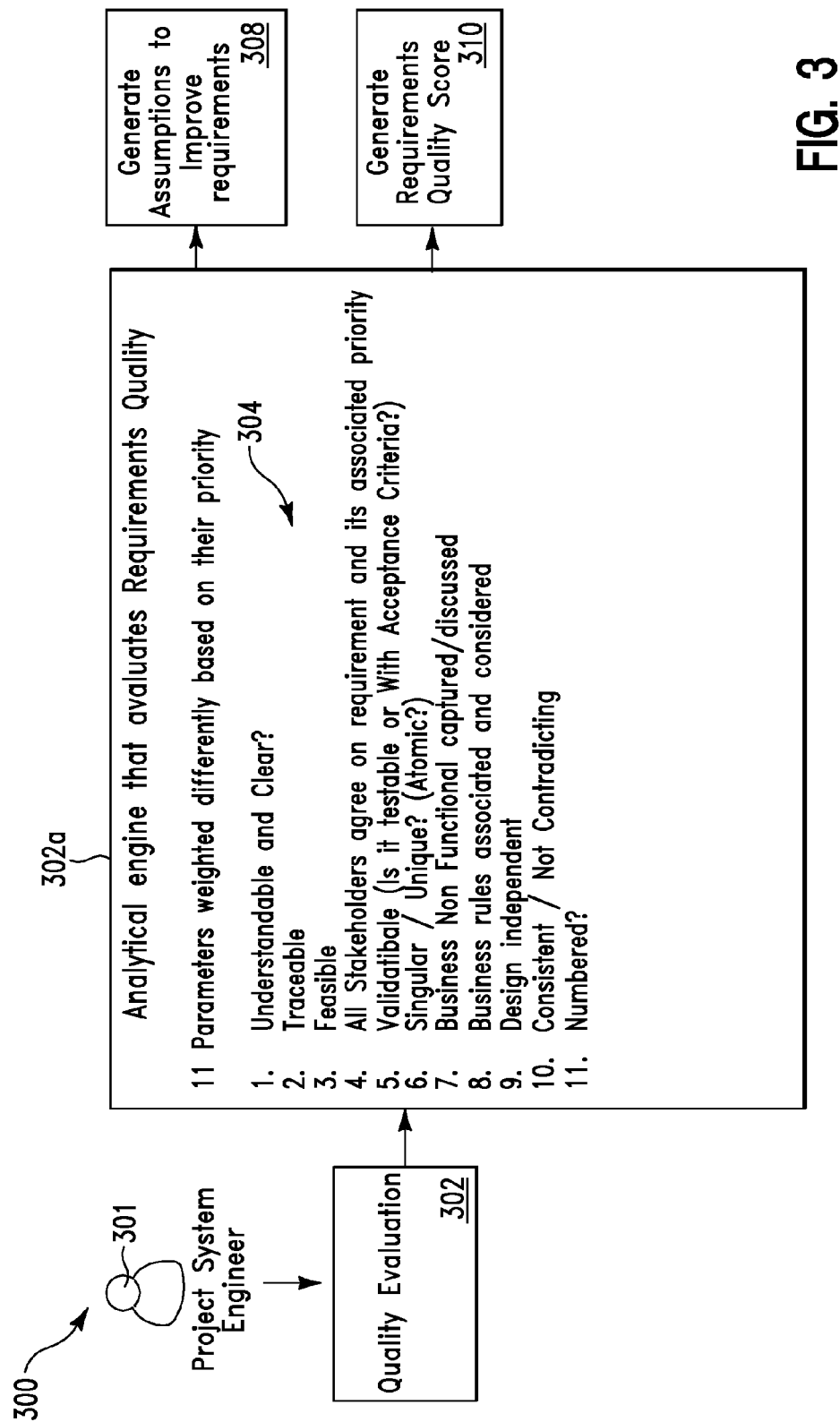
FIGS. 3-13 illustrate algorithms detailing various steps of the algorithm of FIG. 2, in accordance with embodiments of the present invention.

FIG. 3 illustrates an internal logic 300 view of steps 206, 208, and 210 of FIG. 2, in accordance with embodiments of the present invention. Internal logic view 300 illustrates a project systems engineer 301 inputting requirements (NRQ) into a quality evaluation module 302. The quality evaluation module 302 comprises internal logic 302a comprised by an analytical engine evaluating a quality of the requirements based on priority based weighted parameters 304. Additionally, internal logic view 300 illustrates a generate actions module 308 (for generating associated actions) and a generate requirements quality score module (for generating a requirements quality score).

Figure 4:
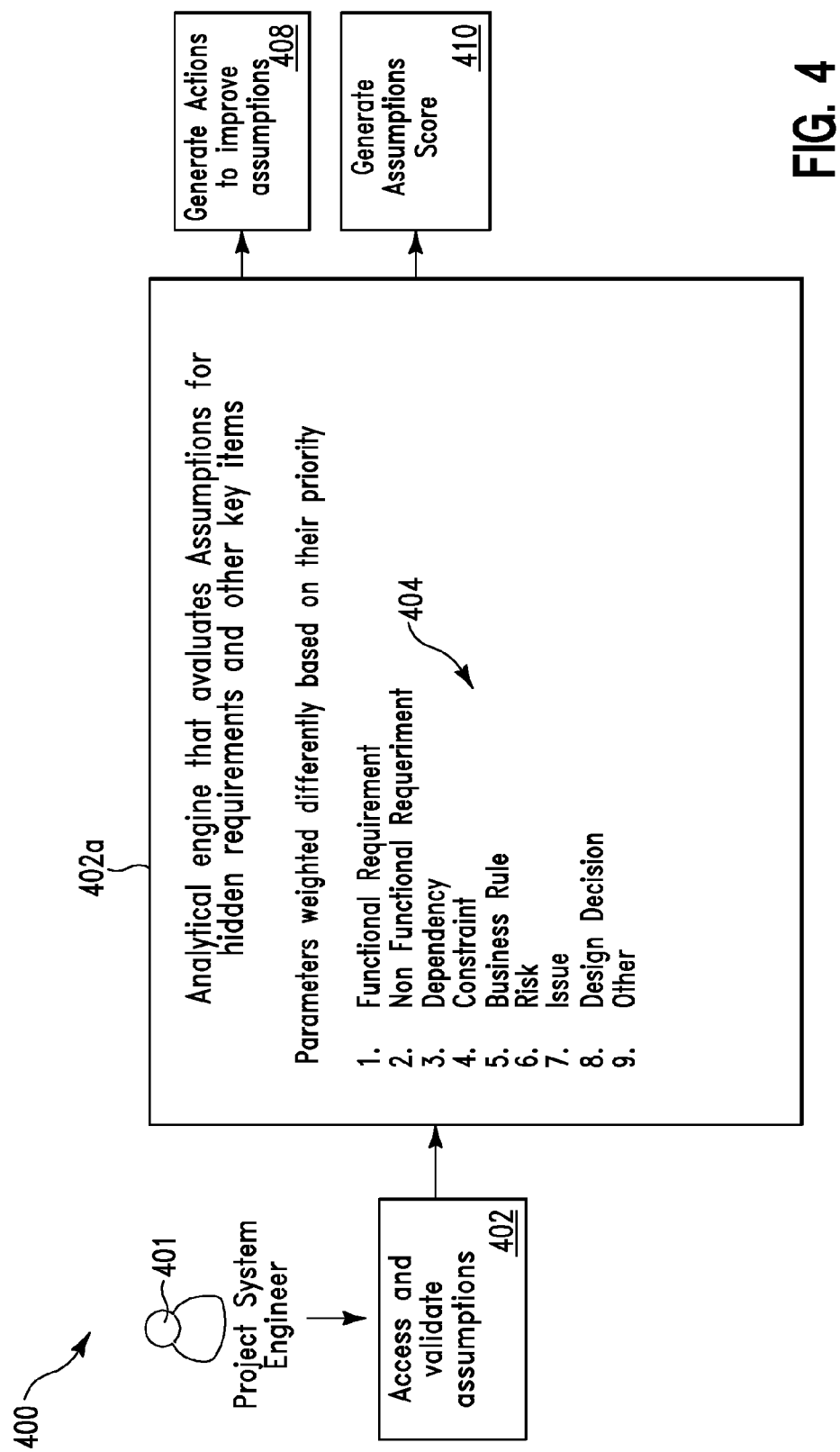

FIG. 4 illustrates an internal logic view 400 of steps 218, 226, and 224 of FIG. 2, in accordance with embodiments of the present invention. Internal logic view 400 illustrates a project systems engineer 401 executing a validate assumptions module 402. The validate assumptions module 402 comprises internal logic 402a comprised by an analytical engine evaluating assumptions for hidden requirements of the requirements based on priority based weighted parameters 404. Additionally, internal logic view 400 illustrates a generate actions module 408 (for generating associated actions) and a generate assumption score module (for generating an assumptions score).

Figure 5:
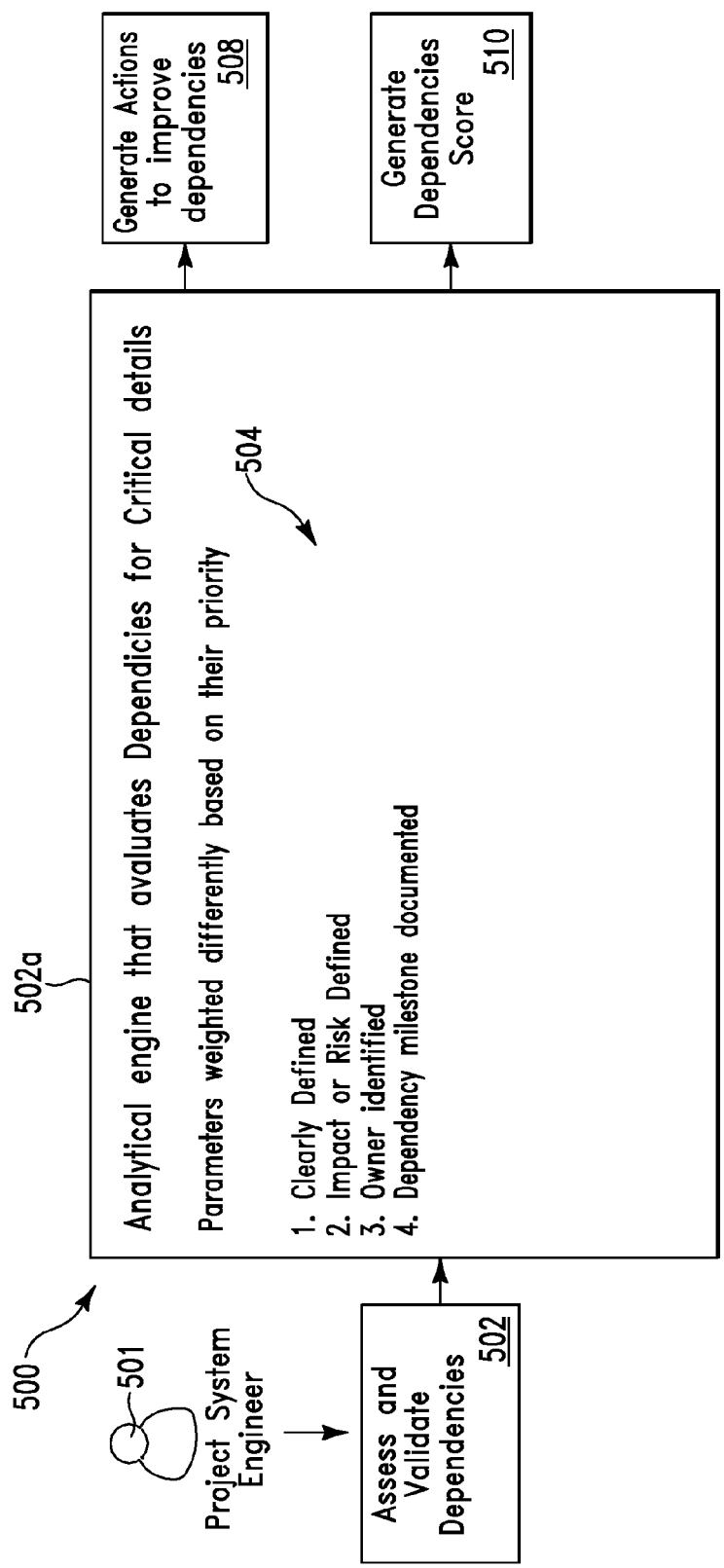

FIG. 5 illustrates an internal logic view 500 of steps 232, 234, and 238 of FIG. 2, in accordance with embodiments of the present invention. Internal logic view 500 illustrates a project systems engineer 501 executing a validate dependencies module 502. The validate dependencies module 502 comprises internal logic 502a comprised by an analytical engine evaluating dependencies for critical details and required information of the requirements based on priority based weighted parameters 504. Additionally, internal logic view 500 illustrates a generate actions module 508 (for generating associated actions) and a generate dependencies score module (for generating a dependencies score).

Figure 6:
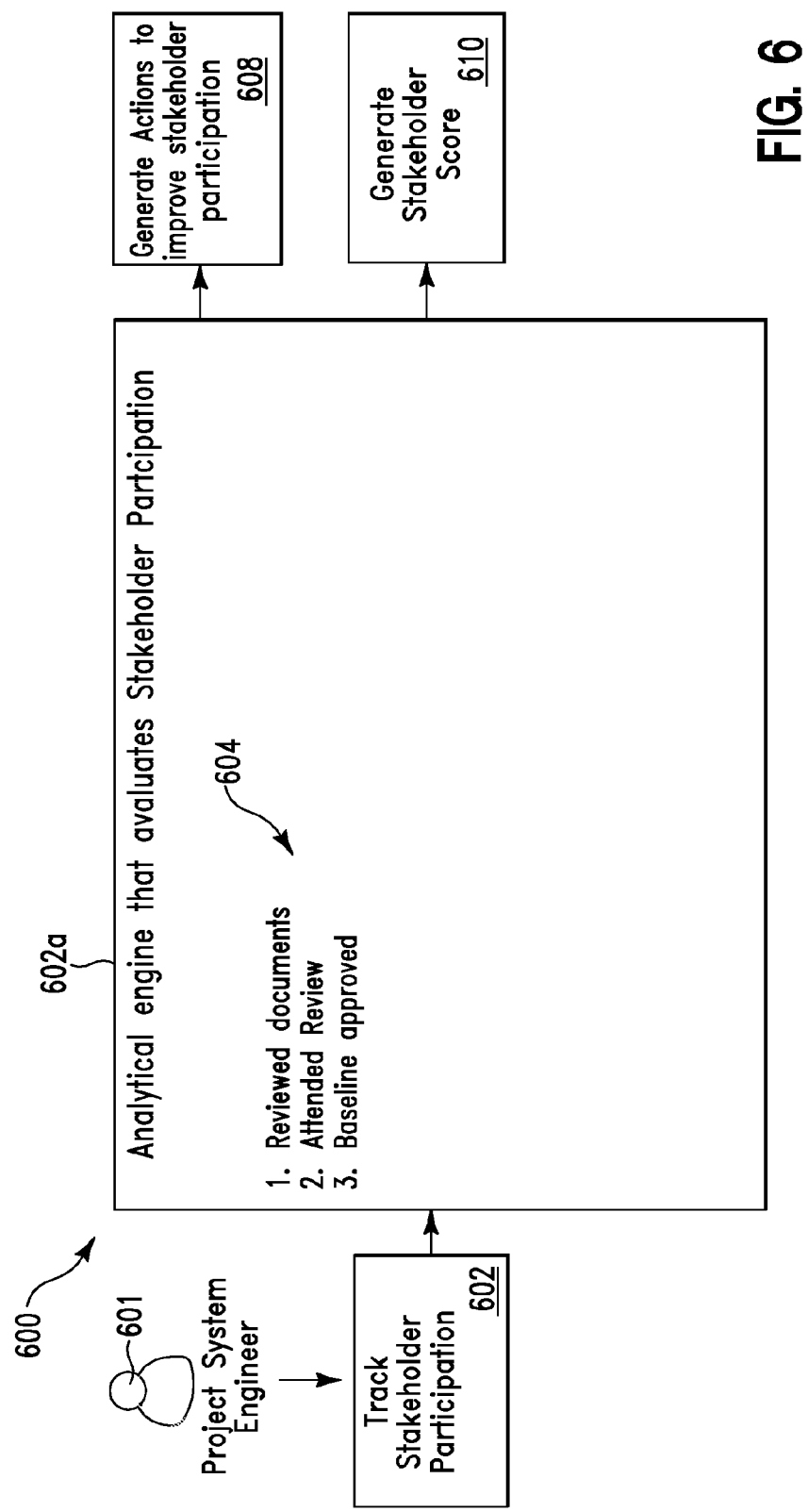

FIG. 6 illustrates an internal logic view 600 of steps 244 and 246 of FIG. 2, in accordance with embodiments of the present invention. Internal logic view 600 illustrates a project systems engineer 601 executing a stakeholder participation tracker module 602. The stakeholder participation tracker module 602 comprises internal logic 602a comprised by an analytical engine evaluating stakeholder participation associated with the requirements based on priority based weighted parameters 604. Additionally, internal logic view 600 illustrates a generate actions module 508 (for generating associated actions) and a generate stakeholder score module (for generating a stakeholder score).

Figure 7:
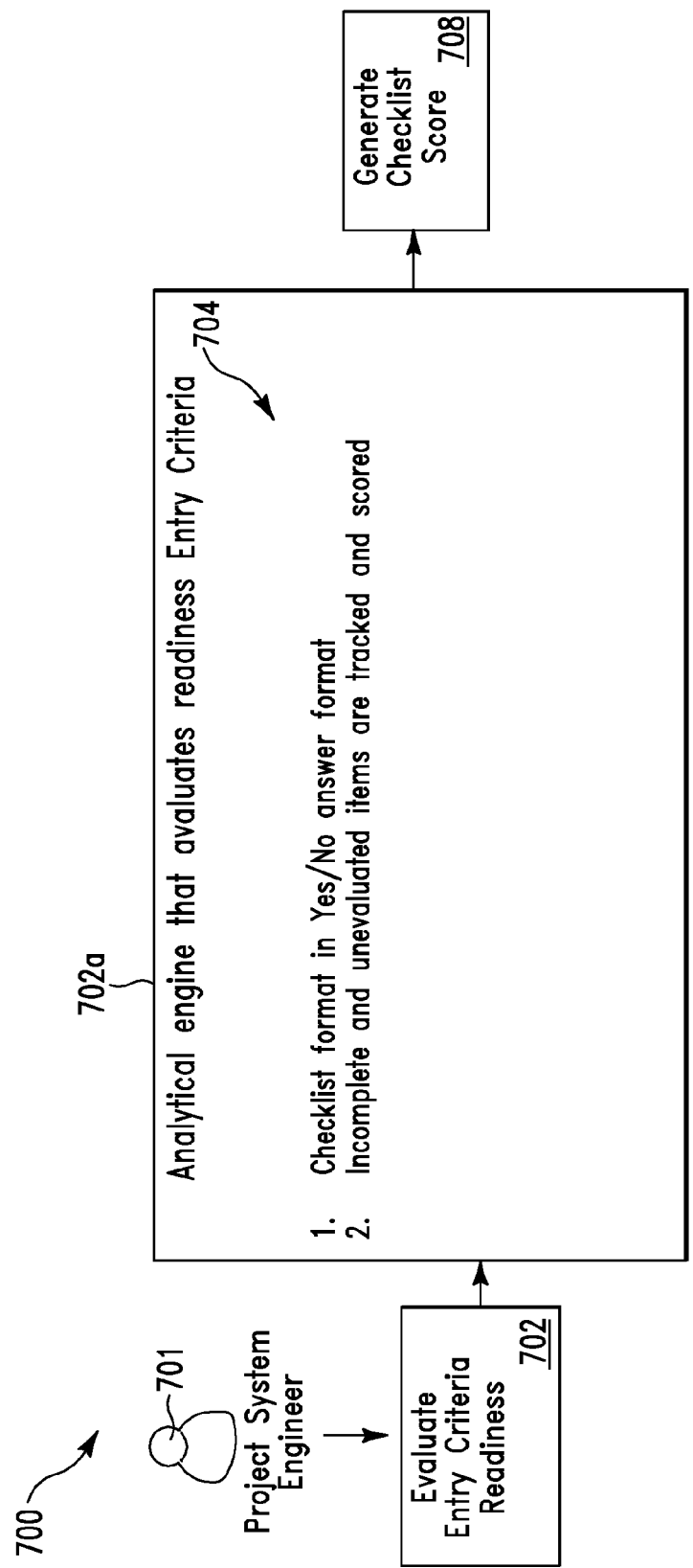

FIG. 7 illustrates an internal logic view 700 of steps 252 and 254 of FIG. 2, in accordance with embodiments of the present invention. Internal logic view 700 illustrates a project systems engineer 701 executing a criteria readiness evaluation module 702. The criteria readiness evaluation module 702 comprises internal logic 702a comprised by an analytical engine evaluating a readiness of criteria associated with the requirements based on priority based weighted parameters 704. Additionally, internal logic view 700 illustrates a generate checklist score module 708 (for generating a checklist score).

Figure 8:
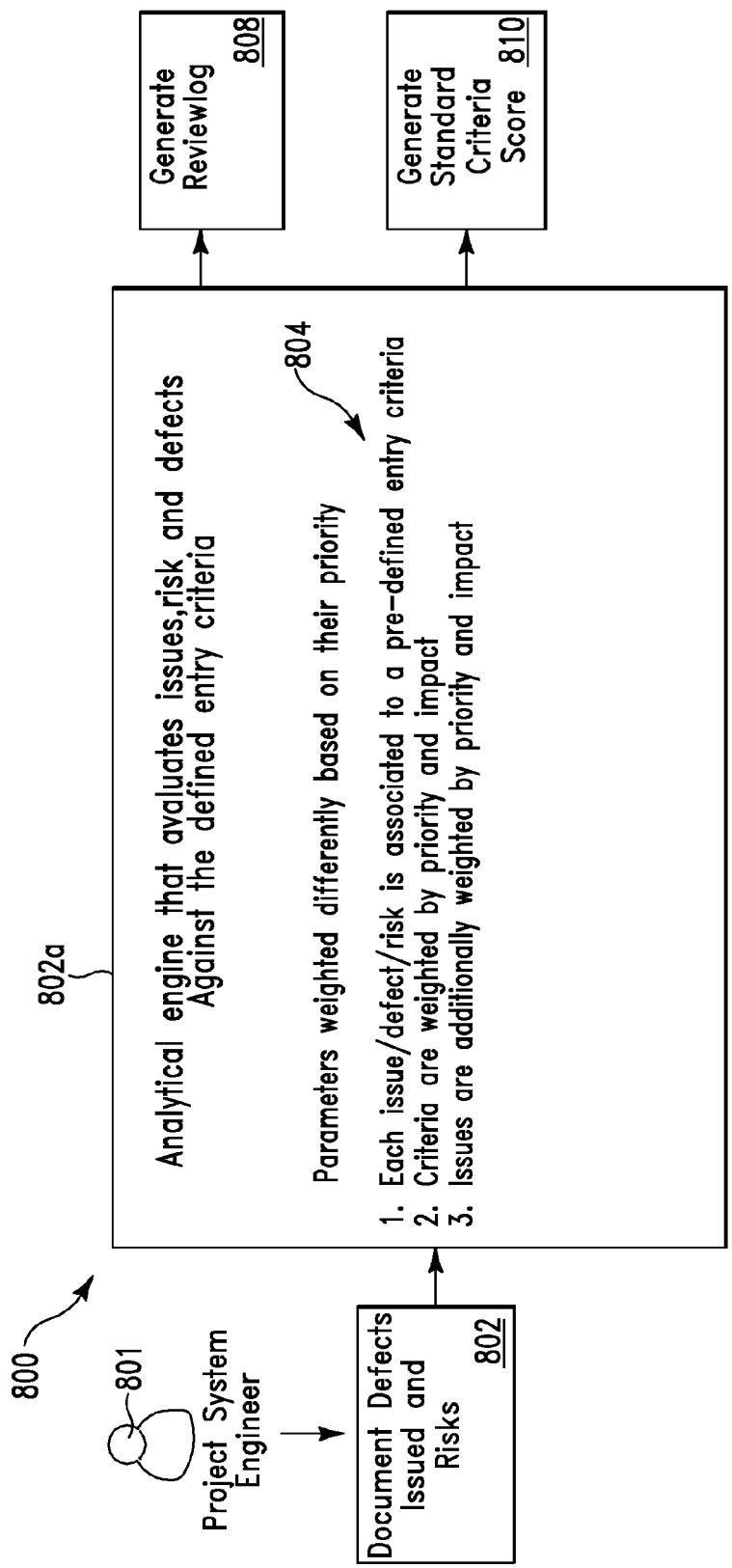

FIG. 8 illustrates an additional internal logic view 800 of steps 252 and 254 of FIG. 2, in accordance with embodiments of the present invention. Internal logic view 800 illustrates a project systems engineer 801 executing a defects module 802. The defects module 802 comprises internal logic 802a comprised by an analytical engine evaluating a risks and defects of criteria associated with the requirements based on priority based weighted parameters 804. Additionally, internal logic view 700 illustrates a review log module 808 and a standard criteria score module (for generating a standard criteria score).

Figure 9:
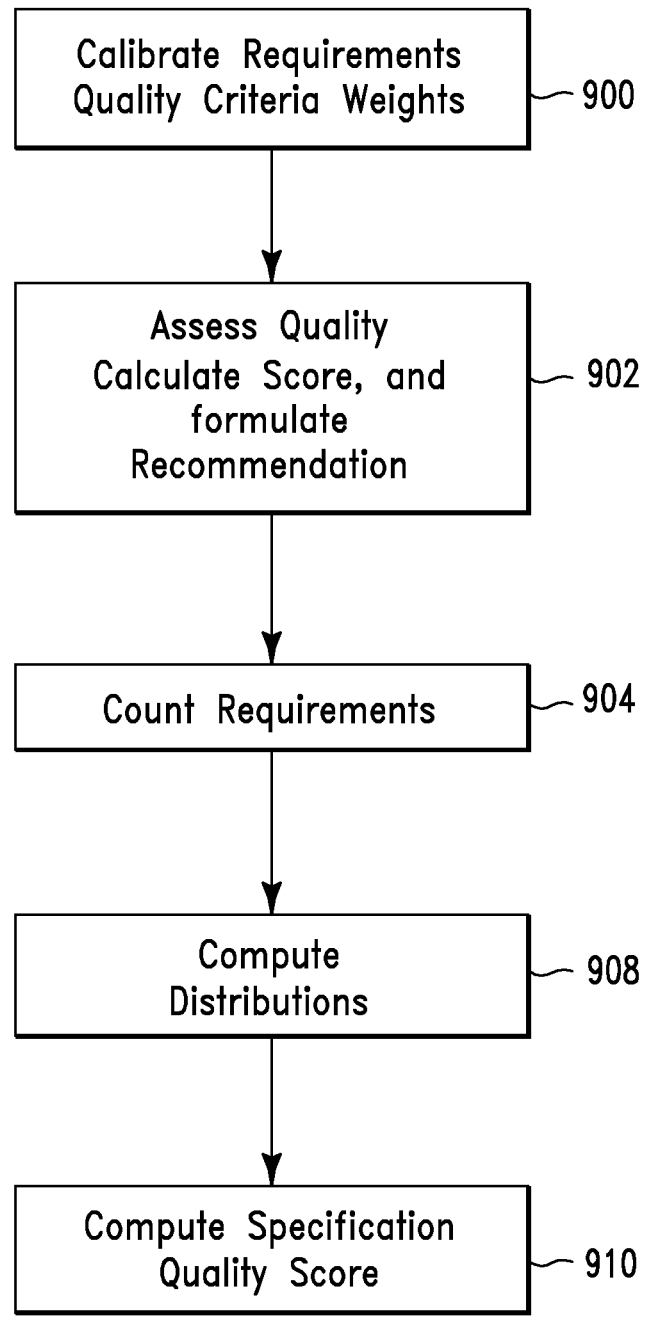

FIG. 9 illustrates an algorithm detailing steps 204 and 210 of FIG. 2, in accordance with embodiments of the present invention. In step 900, requirements quality criteria weights and requirement priority weights are calibrated. The requirements quality criteria weights (adding all weights will add up to 1 (100% scale)) are calibrated by evaluating defaults based on historical trends as illustrated in the following table 1:

TABLE 1

| Requirements Evaluation Criteria | Default Weights |
| --- | --- |
| RE1- Understandable and Clear? | RWE1- 0.1070 |
| RE2-Traceable | RWE2-0.0980 |
| RE3-Feasible | RWE3-0.1150 |

TABLE 1-continued

| Requirements Evaluation Criteria | Default Weights |
|---|---|
| RE4-All Stakeholders agree on requirement and its associated priority | RWE4-0.1150 |
| RE5-Validatable (Is it testable or With Acceptance Criteria?) | RWE5-0.1150 |
| RE6-Singular/Unique? (Atomic?) | RWE6-0.0747 |
| RE7-Business Non Functional captured/discussed | RWE7-0.0980 |
| RE8-Business rules associated and considered | RWE8-0.0747 |
| RE9-Design Independent | RWE9-0.0980 |
| RE10-Consistent/Not Contradicting | RWE10-0.0747 |
| RE11-Numbered? | RWE11-0.0299 |

Calibrating requirements priority weights are illustrated in the following table 2:

TABLE 2

| Requirements Priority | Default Weights |
|---|---|
| RP1-Essential | RWP1-0.7900 (79x) |
| RP2-Conditional | RWP2-0.1600 (16x) |
| RP3-Optional | RWP3-0.0400 (4x) |
| RP4-Non Prioritized | RWP4-0.0100 (1x) |

In step 902 (i.e., for each requirement in a requirement specification), a quality is assessed, a score is calculated, and a recommendation to improve requirement quality is formulated as follows:

$RQ_i$=a requirement number, where i=1 to a total number of requirements (NRQ).

1. Identify and select a type of requirement as follows: Functional (FR), Non Functional (NFR), or other (OR)

$RTY_i$=FR, NFR, or OR

2. Identify and select a requirement priority as follows: Essential (RP1), Conditional (RP2), Optional (RP3), Not prioritized (RP4).

$RQP_i$=$RP1_i$, RP2, RP3, or RP4

3. Evaluate 11 attributes of a quality for a requirement I as follows:
A. $ERE1_i$—Evaluate RE1 for requirement i by selecting yes or no.
B. $ERE2_i$—Evaluate RE2 for requirement i by selecting yes or no.
C. $ERE3_i$—Evaluate RE3 for requirement i by selecting yes or no.
D. $ERE4_i$—Evaluate RE4 for requirement i by selecting yes or no.
E. $ERE5_i$—Evaluate RE5 for requirement i by selecting yes or no.
F. $ERE6_i$—Evaluate RE6 for requirement i by selecting yes or no.
G. $ERE7_i$—Evaluate RE7 for requirement i by selecting yes, no, or not applicable.
H. $ERE8_i$—Evaluate RE8 for requirement i by selecting yes, no, or not applicable.
I. $ERE9_i$—Evaluate RE9 for requirement i by selecting yes or no.
J. $ERE10_i$—Evaluate RE10 for requirement i by selecting yes or no.
K. $ERE11_i$—Evaluate RE11 by for requirement i selecting yes or no.
4. Calculate a requirement quality score $RSC_i$ for each requirement i based on results of the evaluation of the 11 attributes and the aforementioned criteria weights $RSC_i = \Sigma_{n=1}^{11}(RWE_n * ERE_n)$ $ERE_n$ comprises a quality attribute for each said requirement and $RWE_n$ comprises a default weighting factor for each quality attribute.

5. Generate standard action (RSA) messages for improving each requirement i (i.e., by communicating and working with a requirements author). Each requirement i (i.e., comprising an answer of No) is identified from RE1 to RE11. For example, RSA messages may include, inter alia:
A. $RSA1_i$—Requires clarification.
B. $RSA2_i$—Requires tracing to a higher or lower level requirement.
C. $RSA3_i$—Not feasible and requires re-evaluation.
D. $RSA4_i$—Obtain stakeholder agreement or remove requirement.
E. $RSA5_i$—Must include measurable and testable statements.
F. $RSA6_i$—Must be simplified and broken down into additional requirements.
G. $RSA7_i$—Associated non-functional requirements must be discussed and captured if applicable.
H. $RSA8_i$—Associated business rules must be discussed and captured if applicable.
I. $RSA9_i$—Must be rewritten at a higher business level. Document design details in lower level requirements document/specification.
J. $RSA10_i$—Remove or rewrite contradicting requirement.
K. $RSA11_i$—Enumerate requirement.
6. All actions from $RSA1_i$ to $RSA12_i$ are consolidated into one recommendation for a requirement i.

In step 904, a total number of requirements (NRQ) within a requirements specification is counted. For example:
A. NRP1—A number of requirements selected as essential (RP1).
B. NRP2—A number of requirements selected as conditional (RP2).
C. NRP3—A number of requirements selected as optional (RP3).
D. NRP4—A number of requirements selected as non-prioritized (RP4).

Resulting in the following equation: NRQ=NRP1+NRP2+NRP3+NRP4

In step 908, a requirement specification distribution (RSD), a normalized requirement specification distribution (NRSD), and normalized distribution for each requirement type (DERP1, DERP2, DERP3, DERP4) are calculated as follows:

1. Compute a requirement specification distribution (RSD).
2. Compute a distribution of essential requirements (RSD1) by computing a number of essential requirements in the requirements specification times a weight for essential requirements as follows:

RSD1=NRP1*RWP1

3. Compute a distribution of conditional requirements (RSD2) by computing a number of conditional requirements in the requirements specification times a weight for conditional requirements as follows:

RSD2=NRP2*RWP2

3. Compute a distribution of optional requirements (RSD3) by computing a number of optional requirements in the requirements specification times a weight for optional requirements as follows:

RSD3=NRP3*RWP3

4. Compute a distribution of non-prioritized requirements (RSD4) by computing a number of non-prioritized requirements in the requirements specification times a weight for non-prioritized requirements as follows:

RSD4=NRP4*RWP4

Resulting in the following equation: RSD=RSD1+RSD2+RSD3+RSD4

5. Normalize a requirement specification distribution (NRSD) to scale from 0 to 1 (i.e., 0% to 100%), where NRSD—Normalized requirement specification distribution (RSD)

Resulting in the following equation: NRSD=NRSD1+NRSD2+NRSD3+NRSD4=1 (100%)

6. Normalize a distribution of essential requirements (NRSD1) by dividing a distribution of essential requirements (RSD1) by the requirement specification distribution (RSD) as follows:

NRSD1=RSD1/RSD

7. Compute a distribution for each essential requirement (DERP1) by dividing a normalized distribution of essential requirements (NRSD1) by a number of essential requirements (NRP1) as follows:

DERP1=NRSD1/NRP1

8. Normalize a distribution of conditional requirements (NRSD2) by dividing a distribution of conditional requirements (RSD2) by the requirement specification distribution (RSD) as follows:

NRSD2=RSD2/RSD

9. Compute a distribution for each conditional requirement (DERP2) by dividing a normalized distribution of conditional requirements (NRSD2) by a number of conditional requirements (NRP2) as follows:

DERP2=NRSD2/NRP2

10. Normalize a distribution of optional requirements (NRSD3) by dividing a distribution of optional requirements (RSD3) by the requirement specification distribution (RSD) as follows:

NRSD3=RSD3/RSD

11. Compute a distribution for each optional requirement (DERP3) by dividing a normalized distribution of optional requirements (NRSD3) by a number of optional requirements (NRP3) as follows:

DERP3=NRSD3/NRP3

12. Normalize a distribution of non-prioritized requirements (NRSD4) by dividing a distribution of non-prioritized requirements (RSD4) by the requirement specification distribution (RSD) as follows:

NRSD4=RSD4/RSD

13. Compute a distribution for each non-prioritized requirement (DERP4) by dividing a normalized distribution of non-prioritized requirements (NRSD4) by a number of non-prioritized requirements (NRP4) as follows:

DERP4=NRSD4/NRP4

In step 910, a requirements specification quality score (i.e., a requirements quality score) is calculated as follows:
1. For each requirement in a requirement specification, calculate a sub-score ($RSCPT_i$) as a percentage of a requirements specification quality score, where i=1 to total number of requirements (NRQ).
2. Based on a requirement type $RTY_i$ (e.g., essential, conditional, optional, non-prioritized, etc), use the normalized distribution for each requirement (DERP1 or DERP2 or DERP3 or DERP4) to compute the sub-score ($RSCPT_i$) by multiplying the requirement quality score $RSC_i$ times the normalized distribution for each requirement (DERP1 or DERP2 or DERP3 or DERP4) as follows:

$RSCPT_i$=($RSC_i$*DERP1) or ($RSC_i$*DERP2) or ($RSC_i$*DERP3) or ($RSC_i$*DERP4)

3. Add all sub-scores for each requirement to calculate the requirements specification quality score (RSQS) as follows:

$$RSQS = \sum_{i=1}^{NRQ} (RSCPT_i)$$

Figure 10:
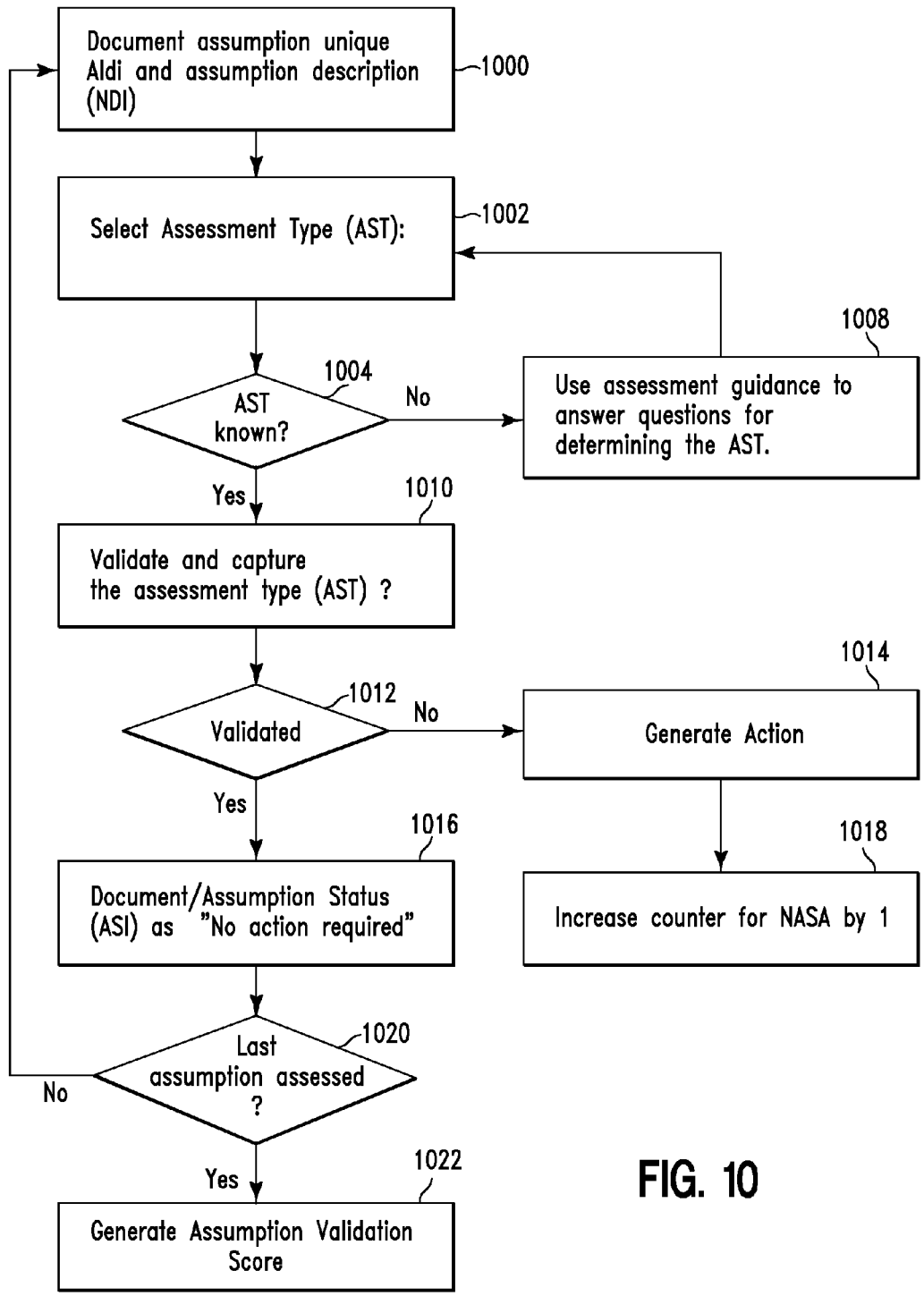

FIG. 10 illustrates an algorithm detailing steps 218, 220, and 224 of FIG. 2, in accordance with embodiments of the present invention. Each of the steps in the algorithm of FIG. 10 is repeated for every assumption starting with a first assumption AIDi=1 until i=NAS (i.e., a total number of assumptions) thereby initializing a number of assumptions requiring actions (NASA to 0). In step 1000, an assumption unique AIDi and an assumption description (AIDi) are documented. In step 1002, an assessment type (AST) is selected. For example, an assessment type may include, inter alia, a functional or non-functional requirement, a dependency or constraint, a business rule or risk, an issue or design decision, etc. In step 1004, it is determined if an AST is known. If in step 1004, it is determined that an AST is not known then in step 1008, assessment guidance is used to answer questions for determining the AST and step 1002 is repeated. If in step 1004, it is determined that an AST is known then in step 1010, the AST is validated and captured. In step 1012, it is determined if the AST has been validated. If in step 1012, it is determined that the AST has not been validated then in step 1014, an action for improving an assumption (AIAi) is generated and an assumption status is documented as "Action Required". In step 1018, a counter for NASA is increased by one. If in step 1012, it is determined that the AST has been validated then in step 1016, an assumption status is documented as "No Action Required". In step 1020, it is determined if a last assumption has been assessed and in step 1022, an assumption validation score is calculated as follows:

(1−(NASA/NAS)).

Figures 11, 11A:
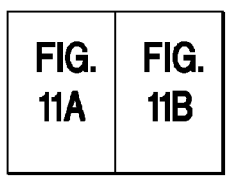
Figure 11B:
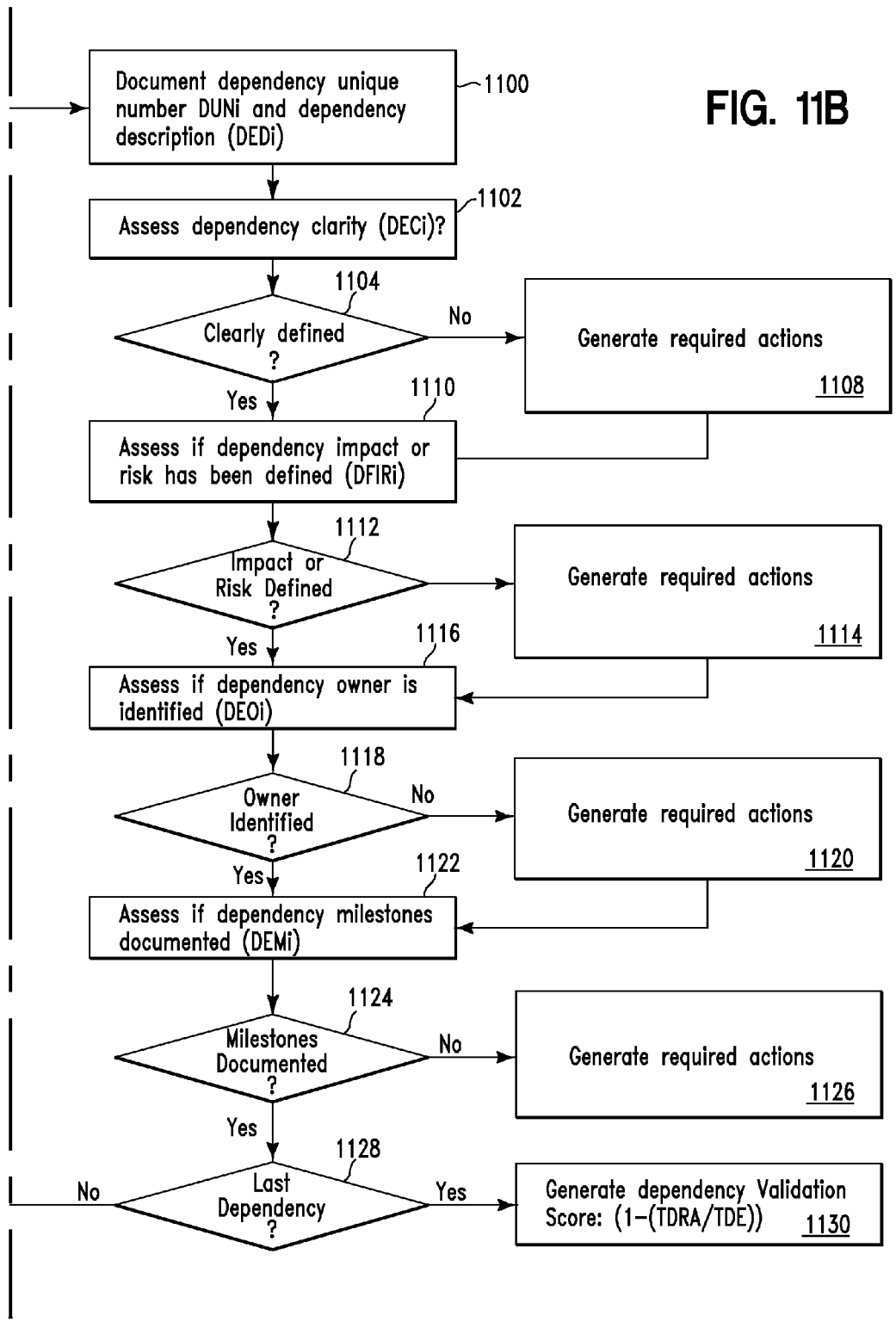

FIG. 11, including FIGS. 11A and 11B, illustrates an algorithm detailing steps 232, 234, and 238 of FIG. 2, in accordance with embodiments of the present invention. Each of the steps in the algorithm of FIG. 11 is repeated for every dependency starting with a first dependency DIDi=1 until i=TDE (i.e., a total number of dependencies) thereby initializing a number of dependencies requiring action (i.e., TDRA to 0). In step 1100, a dependency unique DUNi and a dependency description (DEDi) are documented. In step 1102, a dependency clarity (DECi) is assessed. In step 1104, it is determined if a clarity is defined. If in step 1104, it is determined that a dependency clarity (DECi) is not defined, then in step 1108, required actions for dependency owners are generated. Additionally, a dependency clarity (DECi) is tracked as "Action Required. If in step 1104, it is determined that a dependency clarity (DECi) is defined then in steps 1110 and 1112, it is determined if a dependency impact or risk has been defined (DEIRi). If in steps 1110 and 1112, it is determined that a dependency impact or risk has not been defined (DEIRi) then in step 1114, required actions for dependency owners are generated. Additionally, a dependency impact or risk (DEIRi) is tracked as "Action Required". If in steps 1110 and 1112, it is determined that a dependency impact or risk has been defined (DEIRi) then in steps 1116 and 1118, it is determined if a dependency owner has been identified (DEOi). If in steps 1116 and 1118, it is determined that a dependency a dependency owner has not been identified then in step 1120, required actions for dependency owners are generated. Additionally, a dependency owner (DEOi) is tracked as "Action Required". If in steps 1116 and 1118, it is determined that a dependency owner has been identified then in steps 1122 and 1124, it is determined if dependency milestones have been documented (DEMi). If in steps 1122 and 1124, it is determined that dependency milestones have not been documented then in step 1126, required actions for dependency owners are generated. Additionally, a dependency milestone (DEMi) is tracked as "Action Required". In step 1128, it is determined if a last dependency has been evaluated. If in step 1128, it is determined that a last dependency has been evaluated then in step 1130, a dependency validation score is calculated as follows: (1−(TDRA/TDE)). If in step 1128, it is determined that a last dependency has not been evaluated then in step 1132, TDRA is increased by one and step 1100 is repeated.

Figure 12:
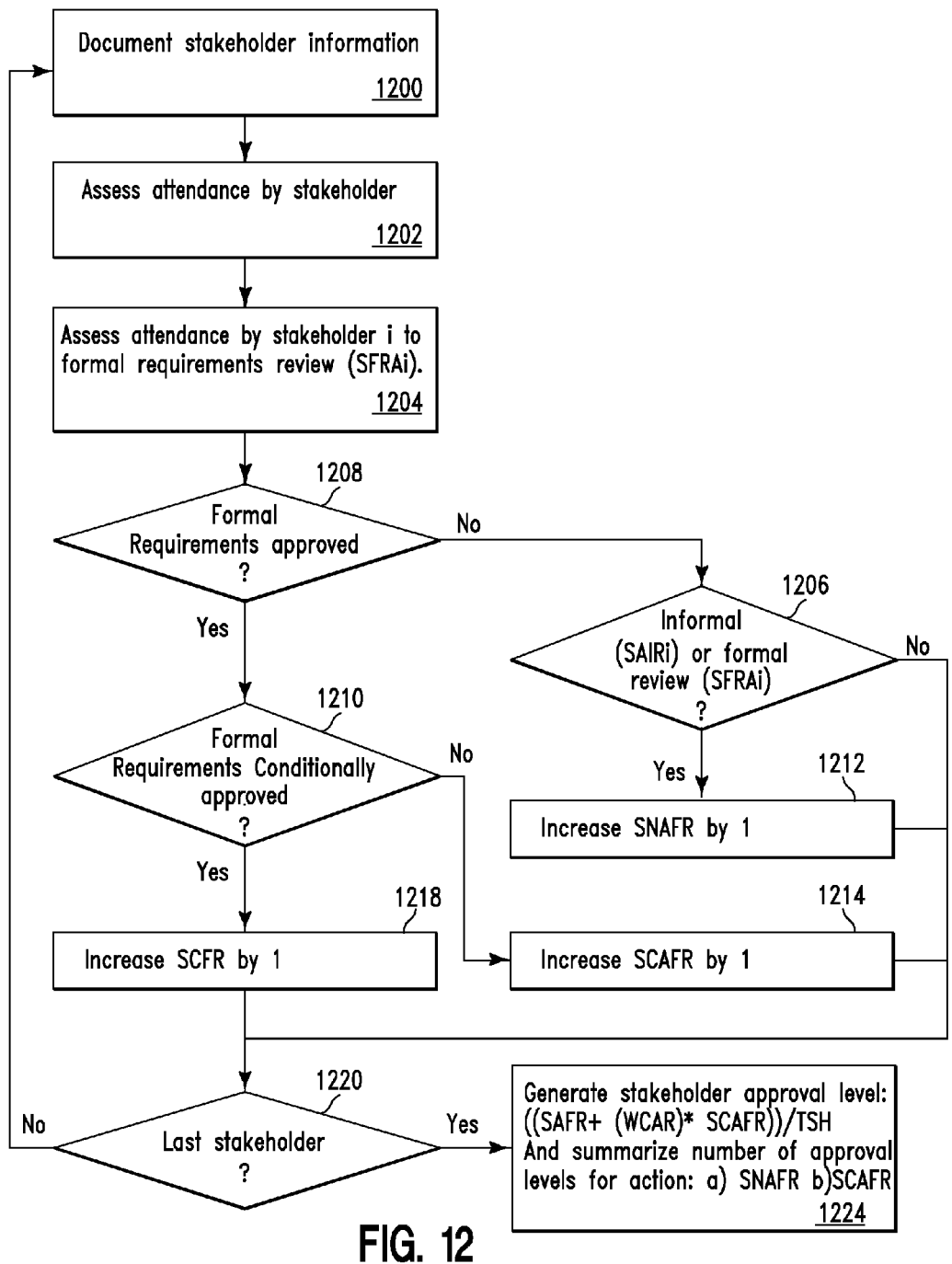

FIG. 12 illustrates an algorithm detailing steps 244 and 246 of FIG. 2, in accordance with embodiments of the present invention. Each of the steps in the algorithm of FIG. 12 is repeated for every stakeholder starting with a first stakeholder SHi=1 until i=TSHH (i.e., a total number of stakeholders).

The following values are initialized:
1. A number of stakeholders that did not approve formal requirements (SNAFR) to 0.
2. A number of stakeholders that conditionally approved formal requirements (SCAFR) to 0
3. A number of stakeholders that approved formal requirements (SAFR) to 0.

Additionally, a weight for conditionally (WCAR) approving requirements is calibrated with respect to a default of 0.5 (50%). In step 1200, stakeholder information (STLi) is documented. Stakeholder information may include, inter alia, a name, email address, role, application, customer, etc. In step 1202, stakeholder attendance (i to informal/preliminary requirements review (SAIRi) and document plan and actual dates) is assessed. In step 1204, stakeholder attendance (i to formal requirements review (SFRAi) and formal requirements review) is assessed. In step 1208, it is determined if formal requirements have been approved. If in step 1208, it is determined that formal requirements have not been approved then in step 1206, it is determined if an informal review (SALRi) or formal review (SFRAi) has been executed and in step 1212 SNAFR is increased by one. If in step 1208, it is determined that formal requirements have been approved then in step 1210, it is determined if formal requirements have been conditionally approved and step 1214 SCAFR is increased by one or in step 1218, SAFR is increased by one. In step 1220, if a last stakeholder has been analyzed then in step 1224, a stakeholder approval level is calculated as follows: ((SAFR+(WCAR*SCAFR))/TSH. In step 1220, if a last stakeholder has not been analyzed then step 1200 is repeated.

Figure 13:
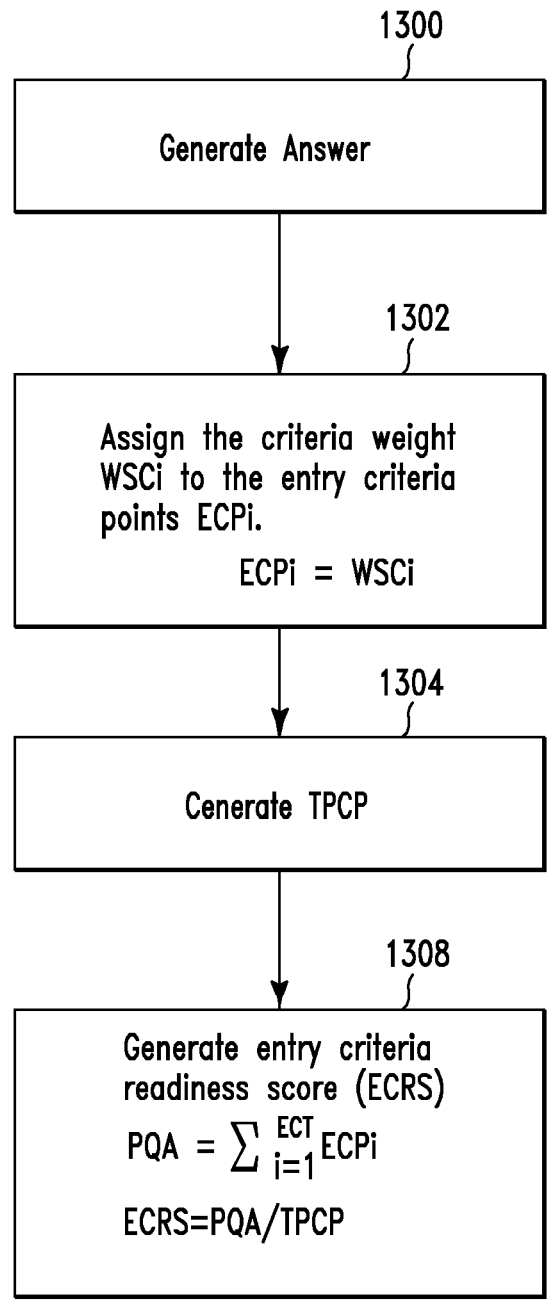

FIG. 13 illustrates an algorithm detailing steps 252 and 254 of FIG. 2, in accordance with embodiments of the present invention. Each of the steps in the algorithm of FIG. 13 is repeated for every standard criteria and checklist item (i.e., entry criteria) starting with a first entry criteria ECi=1 until i=ECT (i.e., entry criteria). In step 1300, an assessment ECAi (all entry criteria assessments) for ECi generates an answer of "Yes", "No", "Not Applicable", or "Not Evaluated". In step 1302, a criteria weight (WSCi) is assigned to entry criteria points ECPi such that ECPi=WSCi. In step 1304, all total possible criteria points (TPCP) are calculated as follows: TPCP=$\Sigma_{i=1}^{ECT}$ WSCi; where WSCi comprises each standard criteria item. In step 1308, an entry criteria readiness score (ECRS) is generated as follows: PQA=$\Sigma_{i=1}^{ECT}$ ECPi and ECRS=PQA/TPCP.

Figure 14:
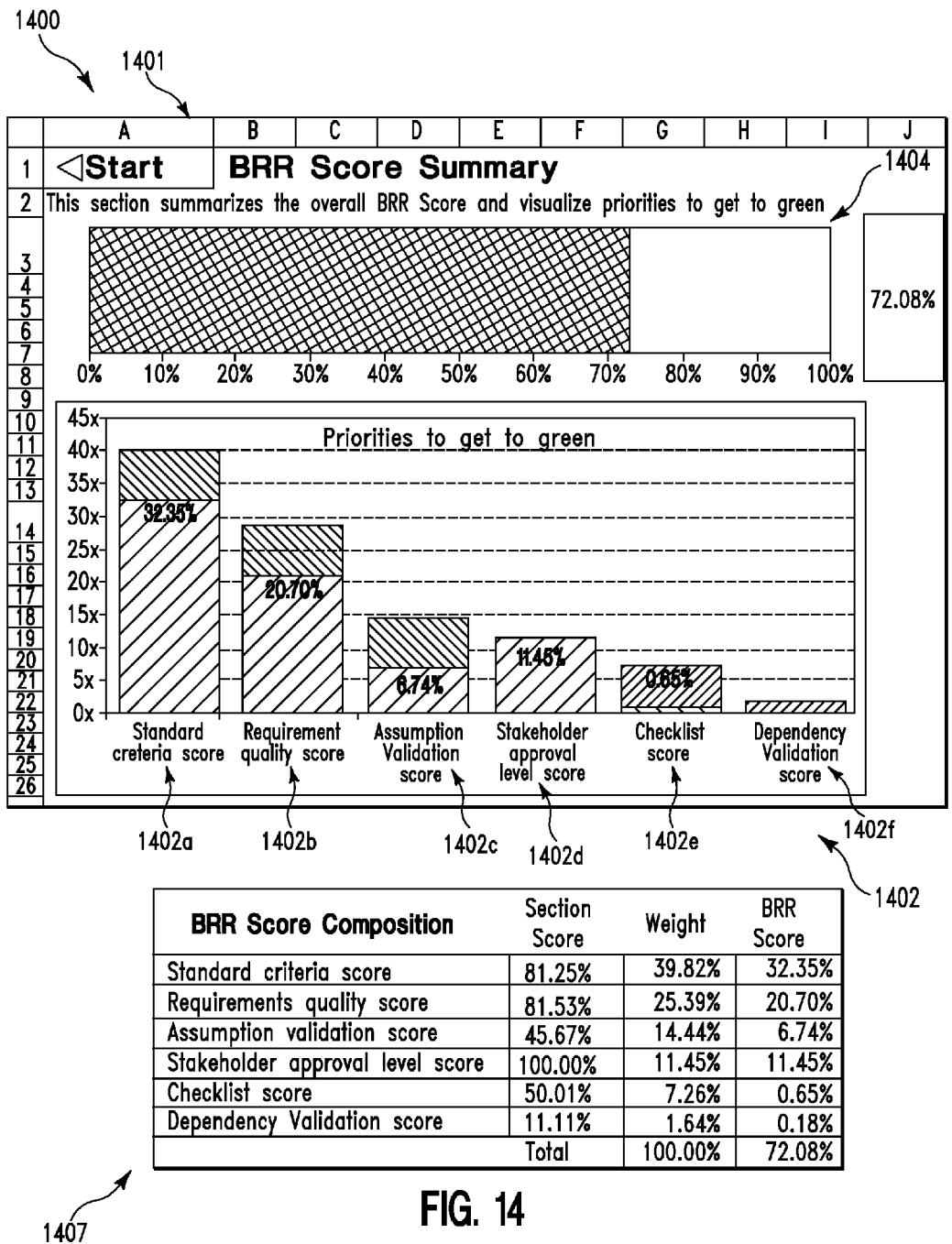
FIG. 14 illustrates a graphical user interface illustrating an overall scorecard summary generated by the algorithm of FIG. 2, in accordance with embodiments of the present invention.

FIG. 14 illustrates a graphical user interface 1400 detailing an overall scorecard summary 1401 generated by the algorithm of FIG. 2, in accordance with embodiments of the present invention. Overall scorecard summary 1401 displays each of scoring elements 1402a . . . 1402f graphically and numerically via chart 1402 and chart 1407. Additionally, overall scorecard summary 1401 displays (graphically and numerically) an aggregated overall health score 1404.

Figure 15:
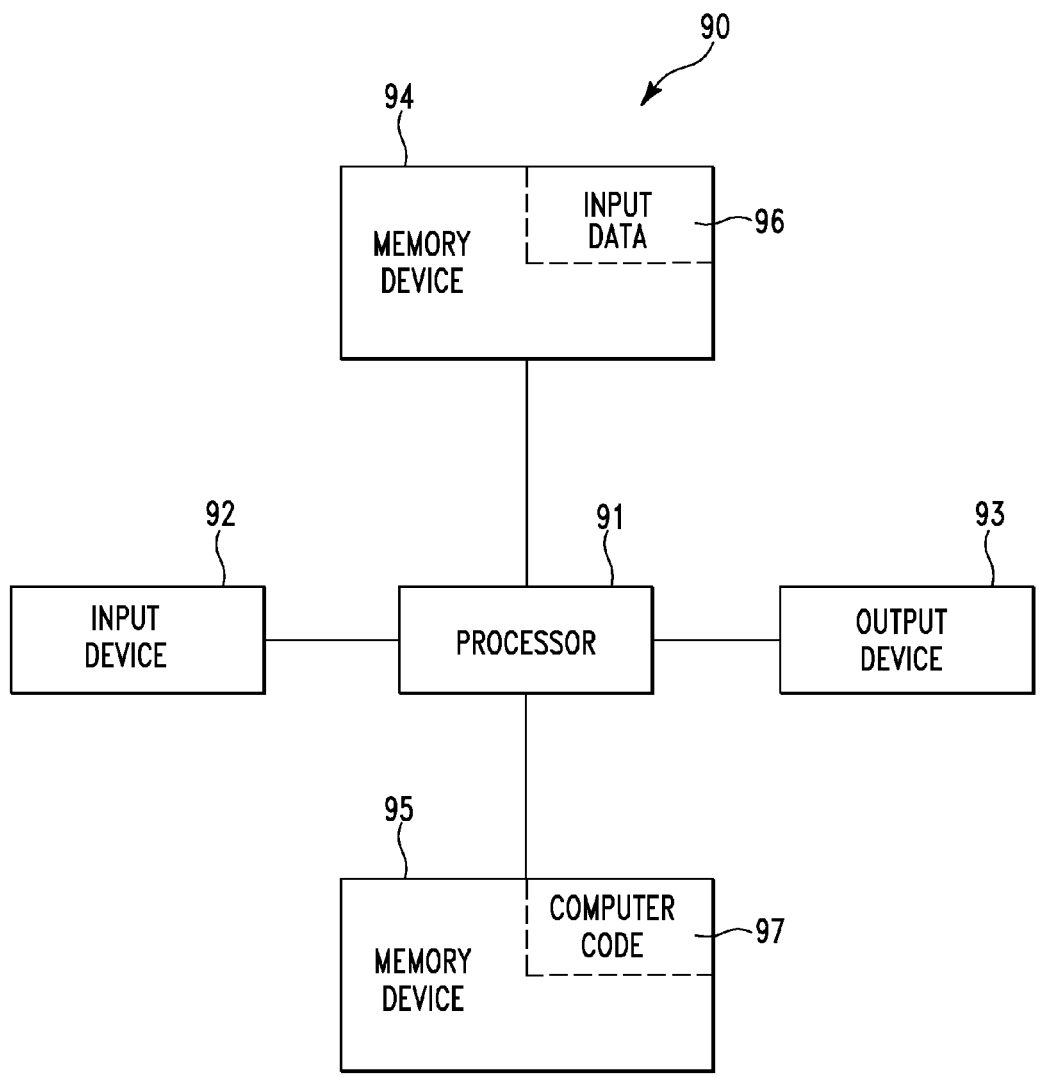
FIG. 15 illustrates a computer apparatus used by the system of FIG. 1 for providing a means for allowing a systems engineer to analyze technical solutions across multiple dimensions, in accordance with embodiments of the present invention.

FIG. 15 illustrates a computer apparatus 90 (e.g., computing system 14 of FIG. 1) used by system 2 of FIG. 1 for providing a means for allowing a systems engineer to analyze technical solutions across multiple dimensions, in accordance with embodiments of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-13) for providing a means for allowing a systems engineer to analyze technical solutions across multiple dimensions. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 15) may include the algorithms of FIGS. 2-13 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

Still yet, any of the components of the present invention could be created, integrated, hosted, maintained, deployed, managed, serviced, etc. by a service supplier who offers to provide a means for allowing a systems engineer to analyze technical solutions across multiple dimensions. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for determining a region within a field of view of an object facing camera. In another embodiment, the invention provides a business method that performs the process steps of the invention on a subscription, advertising, and/or fee basis. That is, a service supplier, such as a Solution Integrator, could offer to provide a means for allowing a systems engineer to analyze technical solutions across multiple dimensions. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 15 shows the computer system 90 as a particular configuration of hardware and software, any configuration of hardware and software, as would be known to a person of ordinary skill in the art, may be utilized for the purposes stated supra in conjunction with the particular computer system 90 of FIG. 15. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An IT system technical solution analysis and development improvement method comprising:
receiving, by a computer processor of a computing system, requirements (NRQ) associated with hardware components for an IT system for design, assumptions associated with said requirements (NRQ), dependency data associated with said requirements (NRQ), stakeholder data associated with said requirements (NRQ), and entry criteria readiness data associated with said requirements (NRQ);
building, by said processor, said requirements (NRQ) into internal logic of a requirements analytical engine software module of a quality evaluation hardware circuit;
evaluating, by said computer processor executing said requirements analytical engine software module, a quality level of said requirements (NRQ);
calculating, by said computer processor executing a requirements quality score hardware circuit based on said quality level, a requirements quality sub-score (RSC) for each requirement of said requirements (NRQ);
evaluating, by said computer processor executing an assumptions analytical engine of a validate assumptions hardware circuit, said assumptions for hidden requirements of said requirements (NRQ);
generating, by said computer processor executing a validate assumptions hardware circuit based on said hidden requirements, an assumptions score for said assumptions;
evaluating, by said computer processor executing a dependencies analytical engine of a validate dependencies hardware circuit, said dependency data;
generating, by said computer processor executing dependencies score hardware circuit based on results of said evaluating said dependency data, a dependencies score for said dependencies data;
evaluating, by said computer processor executing a stakeholder analytical engine, said stakeholder data;
generating, by said computer processor based on results of said evaluating said stakeholder data, a stakeholder approval level score for said stakeholder data;
evaluating, by said computer processor executing a criteria analytical engine, said entry criteria readiness data;
generating, by said computer processor based on results of said evaluating said entry criteria readiness data, an entry criteria readiness score (ECRS) for entry criteria readiness data;
building, by said processor, defects internal logic into said requirements analytical engine software module;
evaluating, by said computer processor executing said defects internal logic, defects of said hardware components for said IT system for design;
generating, by said computer processor, an overall score summary summarizing each said requirements quality score, said assumptions score, said dependencies score, said stakeholder score, and said criteria readiness score, wherein said generating said overall score summary comprises:
assigning priorities and weights to said requirements quality score, said assumptions score, said dependencies score, said stakeholder score, and said criteria readiness score, wherein said overall score summary depicts a quality of a technical solution for said IT system under development thereby automatically enabling a system engineer, associated with said IT system for design, to execute a quality analysis against said overall score summary, and wherein said quality analysis results in hardware enabled prompts, links, and automation processes to support and enable said system engineer to develop said IT system for design thereby improving a requirement quality of said IT system;
integrating, by said computer processor, a technical solution for improving said requirements (NRQ) associated with said hardware components for said IT system for design;
creating and deploying an improved IT system based on said technical solution for improving said requirements (NRQ) associated with said hardware components for said IT system for design; and
presenting, by said computer processor via a plotter hardware device over a network, graphical and numerical charts indicating said overall score summary.

2. The method of claim 1, further comprising:
generating, by said computer processor based on results of said evaluating said quality level of said requirements (NRQ), actions for improving said requirements (NRQ);
executing said actions with respect to requirements (NRQ); and
generating, by said computer processor based on said executing said actions, a modified requirements quality sub-score associated with said requirements quality sub-score (RSC).

3. The method of claim 1, further comprising:
generating, by said computer processor based on results of said evaluating said assumptions, actions for improving said assumptions;
executing said actions with respect to assumptions; and
generating, by said computer processor based on said executing said actions, a modified assumptions score associated with said assumptions score.

4. The method of claim 1, further comprising:
generating, by said computer processor based on results of said evaluating said dependency data, actions for improving said dependency data;

executing said actions with respect to dependency data; and generating, by said computer processor based on said executing said actions, a dependencies score associated with said dependency data.

5. The method of claim 1, wherein each said requirements quality sub-score $(RSC_i)=\Sigma_{n=1}^{11} (RWE_n*ERE_n)$, wherein $ERE_n$ comprises a quality attribute for each said requirement, and wherein $RWE_n$ comprises a default weighting factor for each said quality attribute.

6. The method of claim 5, wherein said evaluating said quality level of said requirements (NRQ) comprises:
calibrating quality criteria weighting factors and priority weighting factors for said requirements (NRQ);
tabulating a total number of specified requirements (i=1) of said requirements (NRQ) within a specified requirements specification;
computing a requirement specification distribution value, a normalized requirement specification value, and a normalized distribution value for each type of said requirements (NRQ); and
computing a requirements quality score (RSQS).

7. The method of claim 6, wherein said computing said requirements quality score (RSQS) comprises:
calculating a sub-score $(RSCPT_i)$, wherein $(RSCPT_i)=(RSC_i)*DERP$, wherein DERP comprises a non prioritized requirement of said requirements (NRQ), and wherein $(RSQS)=\Sigma_{i=1}^{NRQ}(RSCPT_i)$.

8. The method of claim 1, wherein said evaluating said assumptions comprises:
documenting assumption descriptions (ALDi) for said assumptions;
selecting assessment types (AST) for said assumptions;
validating said assessment types (AST); and
documenting assumption statuses (ASi) for said assumptions.

9. The method of claim 8, wherein said assumptions score=1−(NASA/NAS)), wherein NAS comprises a total number of said assumptions, and wherein NASA comprises a number of assumptions requiring actions.

10. The method of claim 1, wherein said evaluating said dependency data comprises:
documenting dependency descriptions (DEDi) and dependency numbers (DUNi) for dependencies of said dependency data;
assessing dependency clarity for said dependencies;
assessing a dependency clarity impact/risk for said dependencies;
assessing a dependency identification for an owner of said dependencies; and
assessing a documented dependency milestones for said dependencies.

11. The method of claim 10, wherein said dependencies score=1−(TDRA/TDE)), wherein TDE comprises a total number of said dependencies, and wherein TDRA comprises a number of said dependencies requiring actions.

12. The method of claim 1, wherein said evaluating said stakeholder data comprises:
determining a number of stakeholders (SNAFR) that did not approve said requirements (NRQ);
determining a number of stakeholders (SCAFR) that conditionally approved said requirements (NRQ);
determining a number of stakeholders (SAFR) that approved said requirements (NRQ); and
determining a weight (WCAR) for conditionally approving said requirements (NRQ).

13. The method of claim 12, wherein said stakeholder approval level score=((SAFR+(WCAR*SCAFR))/TSH, and wherein TSH comprises a total number of stakeholders.

14. The method of claim 1, wherein said evaluating said criteria readiness data comprises:
determining weights (WSCi) associated to standard criteria items of said criteria readiness data;
updating default weights for said standard criteria items;
initializing criteria assessments (ECAi) of said standard criteria items from i=1 to i=total number of standard criteria items and checklist items for evaluation (ECT);
initializing entry criteria points (ECPi) to 0;
adding all of said weights (WSCi); and
initializing all possible criteria points (TPCP), wherein $TPCP=\Sigma_{i=1}^{ECT} WSCi$.

15. The method of claim 14, wherein said entry criteria readiness score (ECRS)=PQA/TPCP.

16. The method of claim 1, further comprising:
providing at least one support service for at least one of creating, integrating, hosting, maintaining, and deploying computer-readable code in the computing system, said code being executed by the computer processor to implement said receiving, said evaluating said quality level, said calculating said requirements quality sub-score), said evaluating said assumptions, said generating said assumptions score, said evaluating said dependency data, said generating said dependencies score, said evaluating said stakeholder data, said generating said stakeholder approval level score, said evaluating said entry criteria readiness data, said generating said entry criteria readiness score (ECRS), and said generating said overall score summary.

17. A computing system comprising a computer processor coupled to a computer-readable memory unit, said memory unit comprising instructions that when executed by the computer processor implements an IT system technical solution analysis and development improvement method comprising:
receiving, by said computer processor, receiving, by a computer processor of a computing system, requirements (NRQ) associated with hardware components for an IT system for design, assumptions associated with said requirements (NRQ), dependency data associated with said requirements (NRQ), stakeholder data associated with said requirements (NRQ), and entry criteria readiness data associated with said requirements (NRQ);
building, by said processor, said requirements (NRQ) into internal logic of a requirements analytical engine software module of a quality evaluation hardware circuit;
evaluating, by said computer processor executing said requirements analytical engine software module, a quality level of said requirements (NRQ);
calculating, by said computer processor executing a requirements quality score hardware circuit based on said quality level, a requirements quality sub-score (RSC) for each requirement of said requirements (NRQ);
evaluating, by said computer processor executing an assumptions analytical engine of a validate assumptions hardware circuit, said assumptions for hidden requirements of said requirements (NRQ);
generating, by said computer processor executing a validate assumptions hardware circuit based on said hidden requirements, an assumptions score for said assumptions;

evaluating, by said computer processor executing a dependencies analytical engine of a validate dependencies hardware circuit, said dependency data;

generating, by said computer processor executing dependencies score hardware circuit based on results of said evaluating said dependency data, a dependencies score for said dependencies data;

evaluating, by said computer processor executing a stakeholder analytical engine, said stakeholder data;

generating, by said computer processor based on results of said evaluating said stakeholder data, a stakeholder approval level score for said stakeholder data;

evaluating, by said computer processor executing a criteria analytical engine, said entry criteria readiness data;

generating, by said computer processor based on results of said evaluating said entry criteria readiness data, an entry criteria readiness score (ECRS) for entry criteria readiness data;

building, by said processor, defects internal logic into said requirements analytical engine software module;

evaluating, by said computer processor executing said defects internal logic, defects of said hardware components for said IT system for design;

generating, by said computer processor, an overall score summary summarizing each said requirements quality score, said assumptions score, said dependencies score, said stakeholder score, and said criteria readiness score, wherein said generating said overall score summary comprises:

assigning priorities and weights to said requirements quality score, said assumptions score, said dependencies score, said stakeholder score, and said criteria readiness score, wherein said overall score summary depicts a quality of a technical solution for said IT system under development thereby automatically enabling a system engineer, associated with said IT system for design, to execute a quality analysis against said overall score summary, and wherein said quality analysis results in hardware enabled prompts, links, and automation processes to support and enable said system engineer to develop said IT system for design thereby improving a requirement quality of said IT system;

integrating, by said computer processor, a technical solution for improving said requirements (NRQ) associated with said hardware components for said IT system for design;

creating and deploying an improved IT system based on said technical solution for improving said requirements (NRQ) associated with said hardware components for said IT system for design; and presenting, by said computer processor via a plotter hardware device over a network, graphical and numerical charts indicating said overall score summary.

18. The computing system of claim 17, wherein said method further comprises:

generating, by said computer processor based on results of said evaluating said quality level of said requirements (NRQ), actions for improving said requirements (NRQ);

executing said actions with respect to requirements (NRQ); and generating, by said computer processor based on said executing said actions, a modified requirements quality score associated with said requirements quality score.

19. The computing system of claim 17, wherein said method further comprises:

generating, by said computer processor based on results of said evaluating said assumptions, actions for improving said assumptions;

executing said actions with respect to assumptions; and generating, by said computer processor based on said executing said actions, a modified assumptions score associated with said assumptions score.

20. A computer program product for an IT system technical solution analysis and development improvement, the computer program product comprising:

one or more computer-readable, tangible storage devices;

program instructions, stored on at least one of the one or more storage devices, to initiate receiving requirements (NRQ) associated with hardware components for an IT system for design, assumptions associated with said requirements (NRQ), dependency data associated with said requirements (NRQ), stakeholder data associated with said requirements (NRQ), and entry criteria readiness data associated with said requirements (NRQ); implements an IT system technical solution analysis and development improvement method comprising:

program instructions, stored on at least one of the one or more storage devices to build, said requirements (NRQ) into internal logic of a requirements analytical engine software module of a quality evaluation hardware circuit;

program instructions, stored on at least one of the one or more storage devices and executed by said requirements analytical engine software module, to evaluate a quality level of said requirements (NRQ);

program instructions, stored on at least one of the one or more storage devices and executed by a quality evaluation hardware circuit of said computing system, to calculate based on said quality level, a requirements quality sub-score (RSC) for each requirement of said requirements (NRQ);

program instructions, stored on at least one of the one or more storage devices and executed by a validate assumptions hardware circuit, to evaluate said assumptions for hidden requirements of said requirements (NRQ);

program instructions, stored on at least one of the one or more storage devices and executed by a validate assumptions hardware circuit, to generate based on said hidden requirements, an assumptions score for said assumptions;

program instructions, stored on at least one of the one or more storage devices and executed by a validate dependencies hardware circuit, to evaluate said dependency data;

program instructions, stored on at least one of the one or more storage devices and executed by a dependencies score hardware circuit, to generate based on results of said evaluating said dependency data, a dependencies score for said dependencies data;

program instructions, stored on at least one of the one or more storage devices, to evaluate said stakeholder data;

program instructions, stored on at least one of the one or more storage devices, to generate based on results of said evaluating said stakeholder data, a stakeholder approval level score for said stakeholder data;

program instructions, stored on at least one of the one or more storage devices, to evaluate said entry criteria readiness data;

program instructions, stored on at least one of the one or more storage devices, to generate based on results of said evaluating said entry criteria readiness data, an entry criteria readiness score (ECRS) for entry criteria readiness data;

program instructions, stored on at least one of the one or more storage devices, to build defects internal logic into said requirements analytical engine software module;

program instructions, stored on at least one of the one or more storage devices and executed by said defects internal logic, to evaluate defects of said hardware components for said IT system for design;

program instructions, stored on at least one of the one or more storage devices, to generate an overall score summary summarizing each said requirements quality score, said assumptions score, said dependencies score, said stakeholder score, and said criteria readiness score, wherein said program instructions to generate said overall score summary comprise:

program instructions to assign priorities and weights to said requirements quality score, said assumptions score, said dependencies score, said stakeholder score, and said criteria readiness score, wherein said overall score summary depicts a quality of a technical solution for said IT system under development thereby automatically enabling a system engineer, associated with said IT system for design, to execute a quality analysis against said overall score summary, and wherein said quality analysis results in hardware enabled prompts, links, and automation processes to support and enable said system engineer to develop said IT system for design thereby improving a requirement quality of said IT system;

program instructions, stored on at least one of the one or more storage devices, to integrate a technical solution for improving said requirements (NRQ) associated with said hardware components for said IT system for design;

program instructions, stored on at least one of the one or more storage devices, to create and deploy an improved IT system based on said technical solution for improving said requirements (NRQ) associated with said hardware components for said IT system for design; and program instructions, stored on at least one of the one or more storage devices, to present, via a plotter hardware device over a network, graphical and numerical charts indicating said overall score summary.

* * * * *